(12) United States Patent
Chowdhury et al.

(10) Patent No.: US 12,530,382 B2
(45) Date of Patent: Jan. 20, 2026

(54) SELF CONTAINED COMMUNICATIONS SYSTEM

(71) Applicant: VORBECK MATERIALS CORP., Jessup, MD (US)

(72) Inventors: Samarpita Chowdhury, Baltimore, MD (US); Josiah Henry, Linthicum, MD (US); Sriram Manivannan, Elkridge, MD (US)

(73) Assignee: Vorbeck Materials Corp., Jessup, MD (US)

( * ) Notice: Subject to any disclaimer, the term of this patent is extended or adjusted under 35 U.S.C. 154(b) by 0 days.

(21) Appl. No.: 18/516,578

(22) Filed: Nov. 21, 2023

(65) Prior Publication Data

US 2025/0258844 A1    Aug. 14, 2025

Related U.S. Application Data

(63) Continuation-in-part of application No. 17/749,129, filed on May 19, 2022, now Pat. No. 12,431,932.

(60) Provisional application No. 63/190,449, filed on May 19, 2021.

(51) Int. Cl.
*G06F 16/29* (2019.01)
*H04W 84/12* (2009.01)
*H04W 84/18* (2009.01)

(52) U.S. Cl.
CPC ............. *G06F 16/29* (2019.01); *H04W 84/12* (2013.01); *H04W 84/18* (2013.01)

(58) Field of Classification Search
CPC ........ G06F 16/29; H04W 84/12; H04W 84/18
See application file for complete search history.

(56) References Cited

U.S. PATENT DOCUMENTS 7,658,901 B2   2/2010   Prud'Homme et al.
8,278,757 B2   10/2012  Crain et al.
(Continued)

OTHER PUBLICATIONS

Pervez et al., "Wireless Technologies for Emergency Response: A Comprehensive Review and Some Guiidelines", Nov. 23, 2018, IEEE Publishing.*

(Continued)

*Primary Examiner* — Todd L Barker
(74) *Attorney, Agent, or Firm* — Woods Oviatt Gilman LLP; Trent V. Bolar, Esq.

(57) ABSTRACT

Embodiments of the present invention relate to a distributed self-contained communications system (dSCCS). The dSCCS includes primary computing devices (PCDs) and secondary computing devices (SCDs). The PCDs and SCDs are man-portable. Each PCS includes a communications device. Each SCD includes geolocation device and a unique digital identifier. The PCDs form a mesh network. Each PCD communicates with a SCD via a LAN. Each SCD transmits their geospatial data and unique identifier to a PCD. Each PCD transmits the geospatial data and unique identifiers to a command node included in the mesh network. The PCD and/or the command node is configured to map the geospatial data and the unique identifier to Earth coordinates in real-time or at predetermined intervals. Each PCD and SCD includes an antenna element that includes graphene dispersed in a polymer. Each SCD includes a heatsink and thermal dissipation structure.

9 Claims, 10 Drawing Sheets

(56) References Cited

U.S. PATENT DOCUMENTS

| | | | |
|---|---|---|---|
| 8,798,593 B2* | 8/2014 | Haney | H04W 4/021 455/414.1 |
| 10,601,104 B2 | 3/2020 | Manivannan et al. | |
| 2021/0204088 A1* | 7/2021 | Ferreira | G01S 5/0284 |
| 2022/0132396 A1* | 4/2022 | Crouthamel | H04W 56/0015 |

OTHER PUBLICATIONS

Wang et al, "Emerging cognitive radio applications: A Survey", IEEE Communications Magazine, vol. 49, Issue 3, Mar. 2011, IEEE Publishing.*

Shahin et al, "Alert Disseminatin iprotocol using service discovery in Wi-Fi direct", IEEE International Conference on Communications, Jun. 8, 2015, IEEE Publishing.*

* cited by examiner

SELF CONTAINED COMMUNICATIONS SYSTEM

CROSS-REFERENCE TO RELATED APPLICATIONS

This application is a continuation-in-part of U.S. patent application Ser. No. 17/749,129, filed May 19, 2022, which claims the benefit of U.S. Provisional Application No. 63/190,449 filed May 19, 2021. These applications are hereby incorporated herein by reference.

BACKGROUND

The present invention relates generally to communications systems and specifically to self-contained communications systems. A self-contained system ("SCS") approach is an architecture that focuses on a separation of the functionality into many independent systems, making the complete logical system a collaboration of many smaller software systems. The idea is to separate a large system into several smaller SCSs, that follow certain rules. Current examples of SCSs include satellites, because they have the ability to receive signals from Earth and retransmit those signals back to Earth or to other satellites with the use of a transponder. Although systems are designed to fit on a rocket and made of durable materials, they are not designed to be man-portable.

The portability of communications systems for federal and state government employees during an emergency are critical to maximizing safety and threat management. Such chaotic times often necessitate a heightened need for personnel to maintain communication with each other while out in the field. For example, it is often important to have up-to-date, reliable information on threats as well as personnel spatial dispositions. Consumers would benefit from a distributed self-contained communications system ("dSCCS") that is man-portable and provides up-to-date spatial disposition of users.

DETAILED DESCRIPTION

Figure 1:
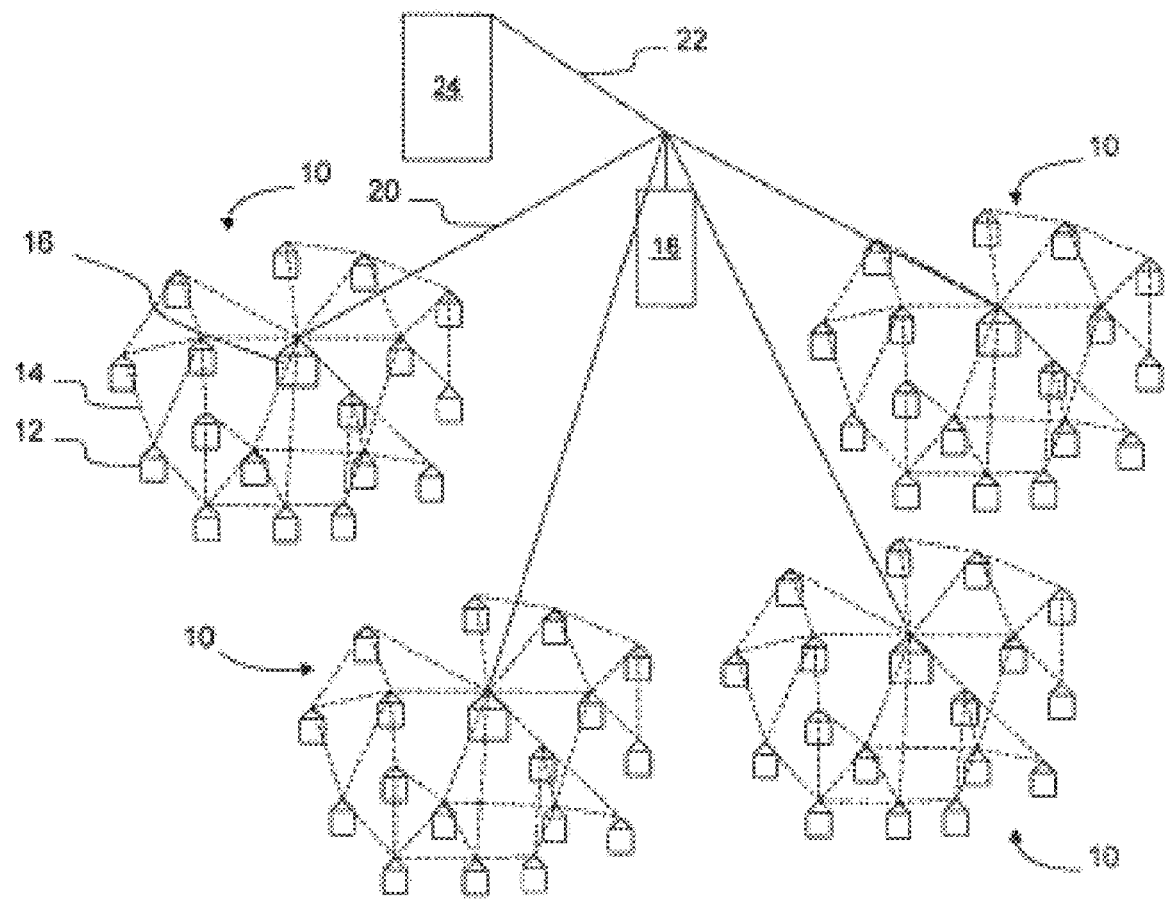
FIG. 1 depicts an exemplary mesh network, in accordance with some embodiment of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Certain terminology may be employed in the following description for convenience rather than for any limiting purpose. For example, the terms "forward" and "rearward," "front" and "rear," "right" and "left," "upper" and "lower," and "top" and "bottom" designate directions in the drawings to which reference is made; with the terms "inward," "inner," "interior," or "inboard" and "outward," "outer," "exterior," or "outboard" referring, respectively, to directions toward and away from the center of the referenced element; the terms "radial" or "horizontal" and "axial" or "vertical" referring, respectively, to directions or planes which are perpendicular; in the case of radial or horizontal, or parallel, in the case of axial or vertical, to the longitudinal central axis of the referenced element; the terms "proximate" and "distal" referring, respectively, to positions or locations that are close or away from a point of reference; "real time" referring to substantially immediate, at the same time that the data is generated, or within the same electronic time frame that the data is generated; and the terms "downstream" and "upstream" referring, respectively, to directions in and opposite that of fluid flow. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows. Angles may be designated as "included" as measured relative to surfaces or axes of an element and as defining a space bounded internally within such element therebetween, or otherwise without such designation as being measured relative to surfaces or axes of an element and as defining a space bounded externally by or outside of such element therebetween. Generally, the measures of the angles stated are as determined relative to a common axis, which axis may be transposed in the figures for purposes of convenience in projecting the vertex of an angle defined between the axis and a surface which otherwise does not extend to the axis. The term "axis" may refer to a line or to a transverse plane through such line as will be apparent from context.

The present invention relates generally to communications systems and specifically to self-contained communications systems. A self-contained system ("SCS") approach is an architecture that focuses on a separation of the functionality into many independent systems, making the complete logical system a collaboration of many smaller software systems. The idea is to break a large system apart into several smaller SCSs, that follow certain rules. Current examples of SCSs include satellites, because they have the ability to receive signals from Earth and retransmit those signals back to Earth or to other satellites with the use of a transponder. Although they are designed to be small enough to fit on a rocket and made of durable materials, they are not designed to be man-portable.

The portability of communications systems for federal and state government employees during an emergency are critical to maximizing safety and threat management. Such chaotic times often necessitate a heightened need for personnel to maintain communication with each other while out in the field. For example, it is often important to have up-to-date, reliable information on threats as well as personnel spatial dispositions. Consumers would benefit from a distributed self-contained communications system ("dSCCS") that is man-portable and provides up-to-date spatial disposition of users.

Data communication networks may include various, hubs, switches, routers, and other network devices, interconnected and configured to handle data as it passes through the network. These devices will be referred to herein as "network elements." Data is communicated through the data communication network by passing data packets (or cells, frames, or segments) between the network elements by utilizing one or more communication links. A particular packet may be handled by multiple network elements and cross multiple communication links as it travels between its source and its destination over the network. Links may be formed over physical structures, such as copper cables and optical fibers, or over wireless links formed using infra-red transmissions or transmissions in a portion of the electromagnetic spectrum.

Network elements can be used to form a wireless mesh network. One characteristic of a mesh network is that in a mesh network there are generally multiple paths through the network that a given user may employ to reach the access point. By allowing traffic to hop from user to user, instead of requiring wireless transmission to take place directly between the user and an access point, it is possible to provide enhanced signal quality to users, especially where the signal may be impeded due to obstacles and other naturally occurring signal impediments. In a mesh network, an access point serves as a connection between the mesh network and a higher bandwidth communication resource, and relay points in the mesh network handle traffic for themselves and for neighboring users.

One example of a mesh network is an 802.11b access mesh. If a set of users in close geographical proximity are equipped with 802.11b cards, they can communicate with other users in a series of hops until reaching an access point of the mesh network. Typically, the access point is connected to a fixed network using a point-to-point link such as an optical fiber, copper loop, or via another wireless transmission. Due to latency and system complexity the number of wireless router hops is typically kept to some maximum, for example six. This limits the area of coverage of a wireless mesh network to a "cluster" or neighborhood community, the clusters being connected to the fixed network via the access points. Additional access points may be added to reduce the number of hops between users and access points, and hence to reduce latency and an amount of occupied bandwidth on the mesh.

An example of a conventional arrangement of wireless meshes is shown in FIG. 1. Another example of a wireless mesh network is given in US Patent application publication no. US 2002/0159409 A1, the content of which is hereby incorporated herein by reference. In the example illustrated in FIG. 1, a number of different mesh networks 10 are shown, each of which may be on the scale of a neighborhood. Each mesh network 10 has a number of relay points 1 connected together and configured to handle traffic on the mesh. For example, each household in a neighborhood may be a relay point in the mesh network, the relay points being interconnected using 802.11b wireless links 14. It is noted that there may be further 802.11b devices communicating with a given relay point's location, such as in a Local Area Network (LAN) or Personal Area Network (PAN). These devices use the same technology as the relay point, can communicate with other relay points, and are considered part of the same mesh network.

In the example illustrated in FIG. 1, each mesh network 10 has an access point 16 connected to a higher bandwidth communication resource such as a Wide Area Network (WAN) base station 18 via a first tier backhaul link 20. The backhaul links 20 may be formed using a conventional point-to-point or point-to-multipoint wireless or wireline technology. In either instance, there is a single path from each access point 16 to the WAN base station 18. In the example shown in FIG. 1, the WAN base station 18 is connected via second tier wired or wireless backhaul link(s) 22 to further networking equipment, such as a central office 24. Due to the large number of first tier backhaul links 20, the full capacity of the first tier backhaul links may not be utilized. Indeed, depending on network architecture, the first tier backhaul links may be required to carry as little as 5% of their available capacity to prevent the call blocking ratio on the secondary backhaul link 22 from becoming onerous. This underutilization of the first tier backhaul links represents an over-provisioning in the first tier backhaul network which is necessary, given the limited geographical range of the mesh networks 10 being served by the first tier backhaul links 20.

Consumers would benefit from a distributed self-contained communications system ("dSCCS") that is man-portable and provides up-to-date (e.g., real-time) spatial disposition of personnel.

Embodiments of the instant disclosure seek to provide a dSCCS that includes primary computing devices ("PCD") that can be configured to communicate with each other via an ad-hoc wireless mesh network. Each PCD can further be configured to communicate with one or more secondary computing devices ("SCD") via a wireless local area network ("wLAN"). Other aspects of the instant disclosure seek to provide SCDs that can be configured to transmit their geospatial data and/or identification data to their respective PCD. Additional aspects of the instant disclosure seek to provide one or more command nodes (a type of PCD) that can be configured to receive geospatial data from other PCD for conveyance via a display and/or other computing device.

Figure 2:
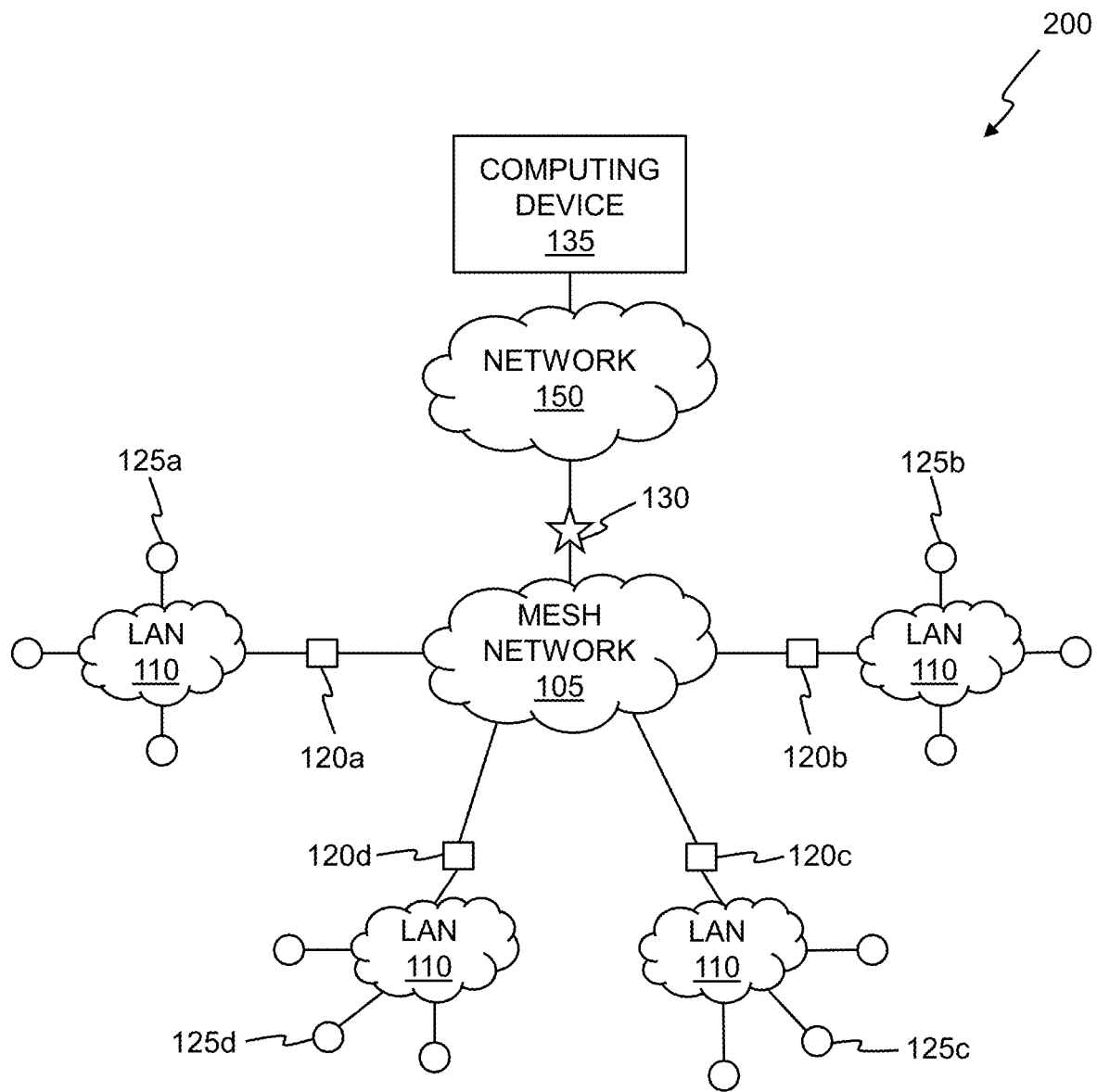
FIG. 2 illustrates a communications scheme for a distributed self-contained communications system (hereinafter "dSCCS"), according to other embodiments.

FIG. 2 illustrates a communications scheme for a dSCCS, generally 200, according to some embodiments. The dSCCS 200 includes a plurality of PCDs 120 and a plurality of SCDs 125. Although not depicted, the dSCCS 200 can include additional or less components than depicted. Each PCD 120 includes a communications device capable of wireless communications. The plurality of PCDs 120 can be configured to form an ad-hoc wireless mesh network (e.g., mesh network 105) with each other utilizing at least one IEEE 802.11x standard. The mesh network 105 allows the dSCCS 200 to minimize the time it takes to transmit data to a command node 130 for analysis and/or transmission, via a WAN (e.g., network 150), to computing devices that are communicatively positioned outside of the mesh (e.g., a computing device associated with a central base).

Each PCD 120 can be configured to form, via the communications device, a wireless local area network (e.g., LAN 110) with at least one other SCD 125 utilizing at least one second IEEE 802.11x standard. For example, each SCD 125*a* seeks to establish the LAN 110*a* with PCD 120*b*. Each SCD 125 includes a geolocation device 520 and a unique identifier to distinguish it from other SCDs 125, which can be useful for identifying personnel in the field. The geolocation device 520 captures geospatial data associated with the SCD 125 (e.g., latitudinal data, longitudinal data, altitudinal data, and/or velocity data). Each PCD 120 is further configured to receive, via their respective LAN 110, information of interest (e.g., the geospatial data and/or the unique identifier) from their associated SCDs 125.

In this manner, each PCD 120 is responsible for storing the information of interest generated by their respective SCDs 125. In preferred embodiments, each SCD 125 communicates only with its associated PCD 120 via its associated LAN 110, which is typically positioned communicatively proximate thereto compared to other SCD 125. Preferably, each SCD 125 is not configured to communicate with devices that are communicatively positioned outside of its LAN 110. In other embodiments, each SCD 125 is configured to communicate with any PCD 120 that is positioned communicatively proximate thereto.

Preferably, at least one PCD 120 is configured to operate as a "command node 130" that communicates, via the network 150, with computing devices that are communicatively positioned external to the mesh network 105. In other words, the command node 130 is configured to function as a central repository for all information of interest associated with the SCDs 125 and the PCDs 120, which negates the need for each PCD 120 to engage in energy intense complex communications schemes. Each PCD 120 is configured to transmit, via their perspective communications device, any stored information of interest (e.g., the geospatial data and the unique identifier) to the command node 130 (e.g., for storage, analysis, subsequent transmission, and/or conveyance via a display associated with the command node 130). In some embodiments, the command node 130 transmits analyzed data and/or received information of interest to one or more other PCDs 120 for display.

Figure 3:
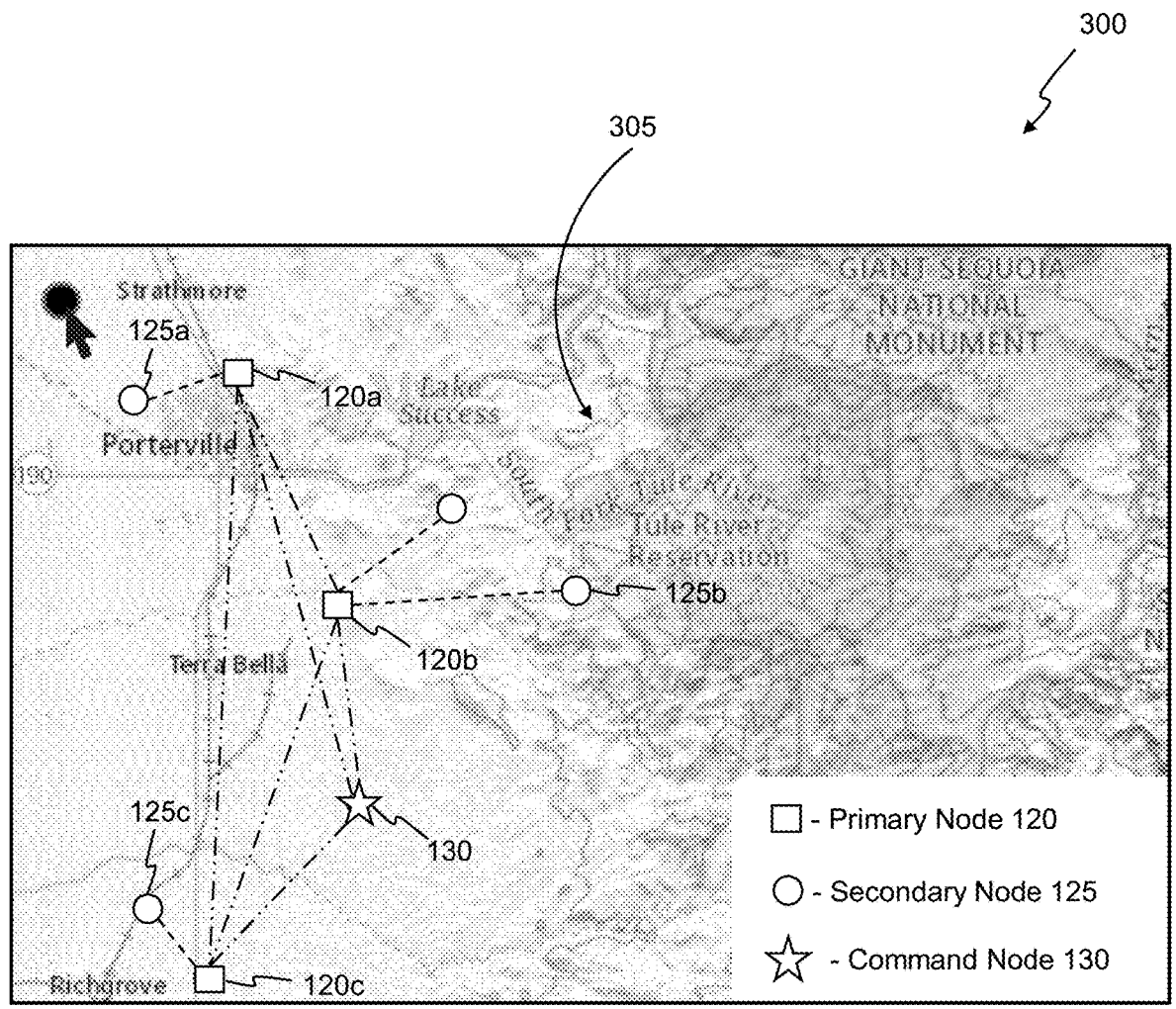
FIG. 3 illustrates a graphical user interface (GUI) depicting a topographical map that reflects a communication scheme between as well as a positional plot of primary nodes, secondary nodes, and a command node, in accordance with certain embodiment of the present invention.

FIG. 3 illustrates an exemplary graphical user interface ("GUI"), generally 300, that depicts a map 305 (e.g., a topographical map) illustrating a communication scheme between the PCDs 120, the SCDs 125, and the command node 130, according to certain embodiments. Applicable maps include, but are not limited to, planimetric maps, topographic maps, thematic maps, navigation maps, and cadastral maps. Ideally, the command node 130 has a display that is configured to convey the GUI 300. Here, the geospatial data is preferably mapped by the command node 130 to Earth coordinates in real-time or at predetermined intervals.

Figure 4A:
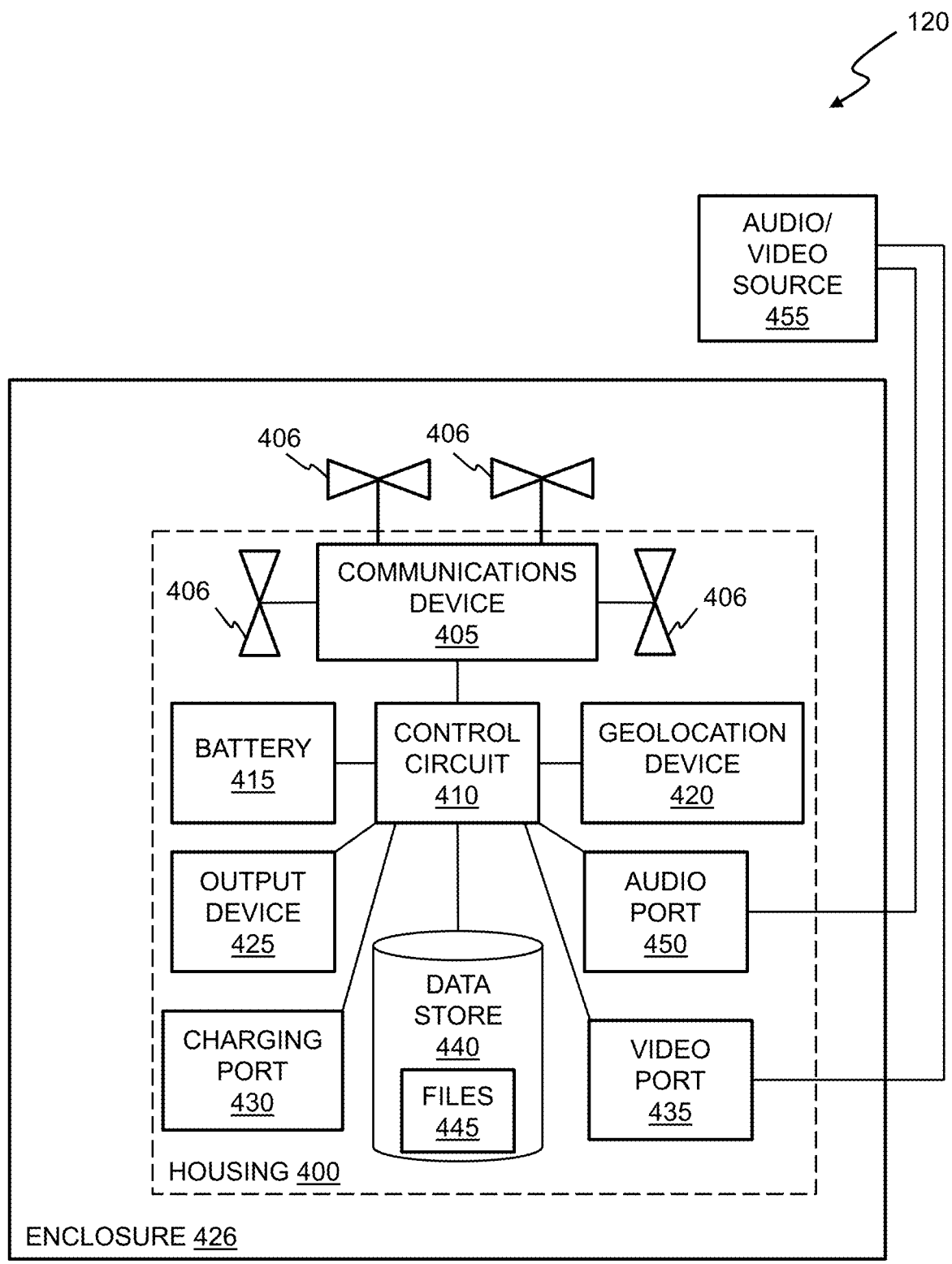
FIG. 4A depicts a block diagram of a primary computing device ("PCD"), in accordance with yet still other.

FIG. 4A depicts a block diagram of the PCD 120, in accordance with yet still other embodiments. The PCD 120 can include the housing 400 rigidly affixed (e.g., via bonding, screws, staples, bolts, and/or similar fasteners) within the enclosure 426. The housing 400 can have an external demountable cover that allows access to its inner space. The housing 400 is preferably configured in a manner to protect the electrical components of the PCD 120 against water, dust, particles to a protection of MIL-STD-810 (Revision H Change 1 released May 18, 2022 by United States Army Test and Evaluation Command), IP65 or higher (as dictated by IEC 60529:1989+AMD1:1999+AMD2:2013 CSV Consolidated version; published Aug. 29, 2013 by the International Electrotechnical Commission (IEC)). IP65 is part of the ingress protection testing and protects against the infiltration of dust, foreign objects and liquids. The IP65 designation means that the object is completely protected against dust and jets of liquid. IP66 is an extension of IP65 and therefore also withstands dust and jets of liquid. The difference is that this rating level provides protection against water pressure at 14.5 pounds per square inch (PSI) with no negative effects to the device.

MIL-STD are standards established by the US military and have become the international standard for testing the durability of a computer. MIL-STD 461G focuses on the EMC and EMI requirements for all electrical and electronic equipment. MIL-STD 810G rating protects against the majority of environmental factors. The certification refers to the ability to withstand extreme conditions such as being dropped onto concrete or weather conditions of extreme temperature, dust and rain. The rigorous testing ensures devices can withstand low pressure (altitude), high temperature, low temperature, temperature shock, humidity, blowing dust, vibration, drop, and freeze/thaw.

The housing 400 is a rigid and hollow structure (e.g., made of polymer, such as Nylon, PLA, ABS, resin, or other non-electrically conductive thermally stable material). The housing 400 includes an opening that allows access to an internal environment. The housing 400 can be manufactured via additive manufacturing, molding, milling, casting, and similar manufacturing processes. Although depicted as a single unit, the housing 400 can include multiple components that are assembled together to form the final product depicted in the figures.

The internal environment can include one or more of a charging port 430, an output device 425, a battery 415, a communications device 405, a geolocation device 420, an audio port 450, and a video port 435 each conductively coupled to a control circuit 410. To be sure, the control circuit 410 can be multiple control circuits that work together to perform one or more steps, processes, and/or functions disclosed in the instant application. The control circuit 410 can be any control circuit known in the art capable of performing one or more steps, processes, and/or functions disclosed in the instant application. Each of the aforementioned components are preferably rigidly affixed within the internal environment of the housing 400. The battery 415 can include one or more electrochemical cells to generate electrical energy. The battery 415 can be a primary or a secondary battery. The battery 415 can be recharged via connecting an external power source to the PCD 125 via the charging port 430.

The charging port 430 can be a physical connector known in the art that mates with another connector (usually a type of plug on the end of a cable) to electrically connect the PCD 120 to an external power source (e.g., an electrical outlet, portable electric generator, battery pack, and similar external power sources known in the art). In certain embodiments, the PCD 120 includes an inductive charging element to facilitate wireless power transfer. The control panel can be a flat area that includes control instruments and interface elements. The control panel allows access to the output device 425 (e.g., a battery power indicator LED, a network status indicator LED, and/or similar device), the audio port 450, the video port 435, the charging port 430, and/or a power switch. Note, the battery power indicator LED can convey the percentage of power that remains in the battery (e.g., 10%, 25%, etc.) and/or a low power status.

The communications device 405 is a device that wirelessly transmits and receives information (i.e., data) using a wireless communications protocol known in the art or compatible with an embodiment of the instant disclosure. In other words, the communications device 405 allows the PCD 120 to establish a communications network (e.g., the mesh network 105 and/or the network 150) with one or more other devices. In certain embodiments, the communications device 405 includes a plurality of devices that work together to perform one or more communications tasks disclosed in the instant application. The communications device 405 is conductively coupled to and preferably communicates via one or more antenna elements 106 (e.g., send and/or receive data modulated via one or more communications protocols known in the art).

The communications device 405 can communicate via one or more communication protocols known in the art (or compatible therewith) that include, but are not limited to, UHF, VHF, Long-Term Evolution ("LTE"), 3G, standards based on GSM/EDGE and/or UMTS/HSPA, Wi-Fi, IEEE 802.11 standards, General Packet Radio Service ("GPRS"), local area networking ("LAN") protocols, ("WAN") wide area networking protocols, Bluetooth®, microwave, and similar wireless communications protocols. The control circuit 410 is configured to establish, via the communications device 405, the mesh network 105 with a plurality of computing devices (e.g., other PCD 120 as well as other communications devices) that each connects directly, dynamically, and non-hierarchically to the mesh network 105.

The antenna element 406 is an electrical conductor that is utilized via the communications device 405 to wirelessly transmit and receive information (i.e., radio waves), according to preferred embodiments. The antenna element 406 is preferably configured to substantially conforms to the contours of the enclosure 426, the housing 400, and/or the torso of the user 401 (see FIG. 4B). In order to do so, the antenna element 406 is preferably a planar, flexible, and bendable/foldable structure that has a reduced visual signature (e.g., having a side profile of less than 2 mm thick). The antenna element 406 can have a radius of curvature of 0.1-3 inches to thereby allow the antenna element to bend, twist, and/or conform to the contours of a structure and maintain functionality. The antenna element 406 can be an antenna array (e.g., a plurality of antenna elements 406 communicatively interconnected to work together as a single antenna to transmit or receive radio waves). For example, the antenna array can be configured as a phased array to enable directional RF signal transmission or reception. The antenna element 406 can be formed (e.g., via printing, molding, coating, and similar deposition techniques) using a conductive composition that includes a polymer(s) and fully exfoliated single sheets of graphene.

The fully exfoliated single sheets of graphene preferably form a three-dimensional percolated network within the polymer(s), which yields superior conductivity for the composition compared to un-percolated compositions that may rely more on the conductivity of the polymer and/or an electrically conductive addictive. The fully exfoliated single sheets of graphene are separated on a nanoscale within the polymer(s). The fully exfoliated single sheets of graphene are about 1 nm thick and substantially planar. In certain embodiments, the fully exfoliated single sheets of graphene have surface imperfection (i.e., "wrinkles" or "kinks") resulting from the presence of lattice defects in, or by chemical functionalization of the two-dimensional hexagonal lattice structure of the basal plane. Applicable polymers include, but are not limited to, polyethylene terephthalate, acrylic, rayon, aramid, modacrylic, spandex, nylon, olefin, polyester, saran, sulfur, polypropylene, polyethylene, elastane, and similar polymers.

In preferred embodiments, the fully exfoliated graphene sheets (i.e., the graphene sheets) as well as the conductive composition are generated as disclosed in U.S. Pat. No. 7,658,901 B2 by Prud'Homme et al; U.S. Pat. No. 8,278,757 B2 by Crain; US Patent Pub. No. 2011/0189452 A1 by Lettow et al.; and US Patent Pub. No. 2014/0050903 A1 by Lettow et al., which are each hereby incorporated by reference in their entirety. The fully exfoliated graphene sheets preferably have a surface area of about 2,630 $m^2/g$ to promote a low percolation threshold of, for example, 0.52 vol. %. To be sure, neither carbon nanotubes (e.g., SWCNT or MWCNT) nor graphite are substitutions of the aforementioned fully exfoliated graphene sheets due the different inherit structural, electrical, and mechanical properties of the materials. For example, the fully exfoliated graphene sheets have a platy (e.g., two-dimensional) structure as opposed to the three-dimensional structure of carbon nanotubes and graphite, which results in higher percolation thresholds. The fully exfoliated graphene sheets have a higher surface area compared to SWCNTs, MWCNTs, and graphite, which contributes to its lower percolation threshold.

In other embodiments, each PCD 120 transmits its geospatial data to at least one other PCD 120 and/or the command node 130 via the mesh network 105. The geolocation device 420 is a computing device that is capable of receiving geopositional information from one or more satellite navigation systems (e.g., Global Positioning System (GPS), Global Navigation Satellite System (GLONASS), BeiDou Navigation Satellite System, Galileo navigation satellite system, Quasi-Zenith Satellite System, Indian Regional Navigation Satellite System, or similar satellite-based radio navigation systems) and then analyzing such information to calculate the geographical position of the PCD 120. Using suitable software, the geolocation device 420 may convey the position via the output device 425 and/or provide routing directions. The output device 425 is computer hardware known in the art that communicates information (e.g., stored in the files 445, received and/or generated via the communications device 405 or the geolocation device 420) into a human-perceptible form (e.g., text, graphics, tactile, audio, or video). The output device 425 can be partially externally positioned on the enclosure to be viewable by the user without necessitating the user to open the housing 400 to access the internal environment (e.g., the control panel).

Figure 4B:
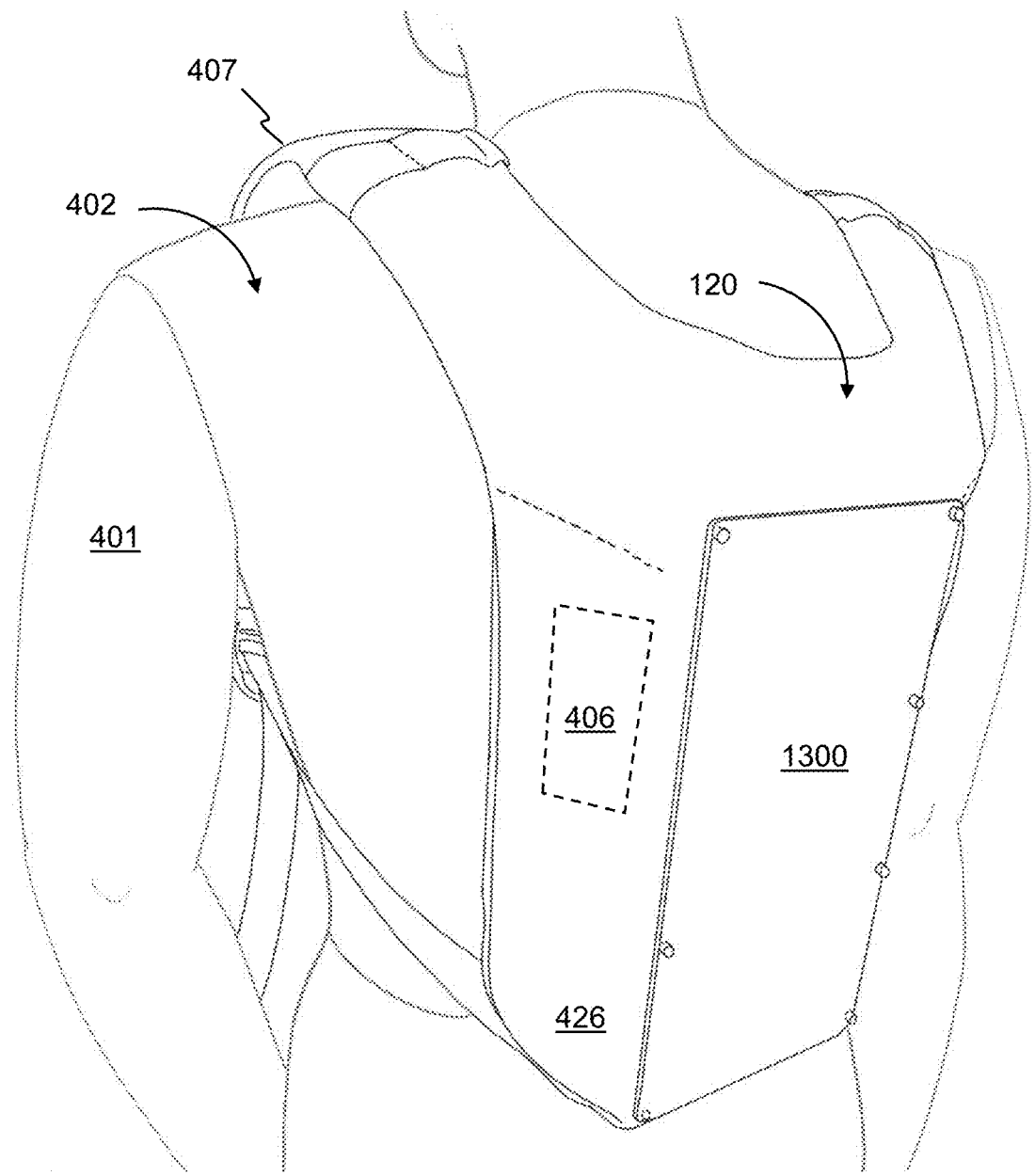
FIG. 4B illustrates a rear view of a user wearing the PCD, in accordance with some embodiments.
Figure 4C:
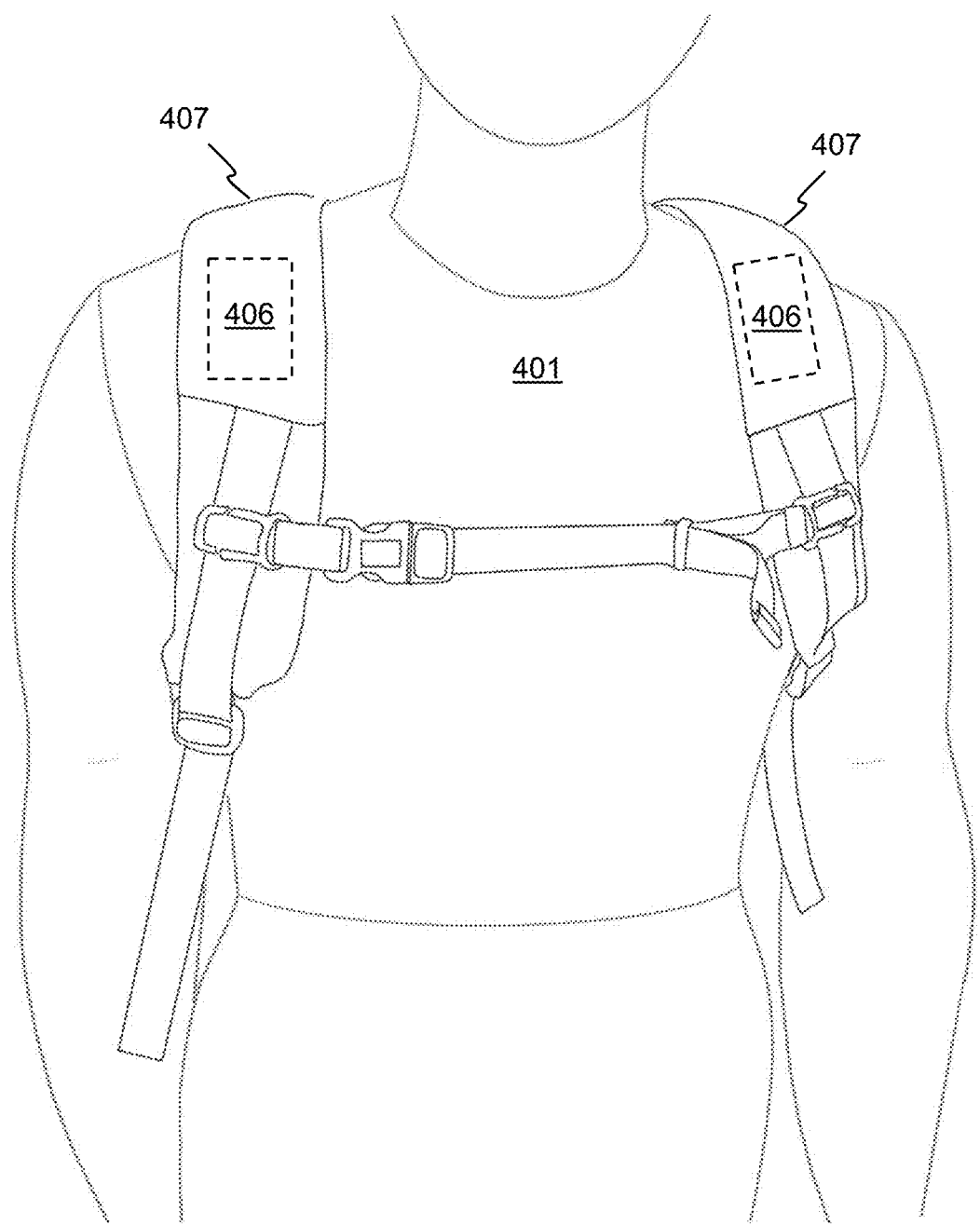
FIG. 4C illustrates front view of the user from FIG. 4B wearing the PCD, in accordance with other embodiments.

When present, the output device 425 is communicatively coupled to the control circuit 410. For example, to operate in extreme conditions (e.g., environments having abnormal temperatures and/or increase probability of physical impact events), the output device 425 can be a light-emitting diode (LED), which have a low power consumption requirements, long lifetimes, and enhanced physical robustness, and a small footprint. The output device 425 can be configured to convey to the user whether the PCD 120 is successfully networked with another copy of the PCD 120 and/or the command node 130 (i.e., whether the mesh network 105 and/or the network 150 is established). In preferred embodiments, at least one of the PCD 120 is man-portable (as depicted in FIGS. 4B and 4C) to allow a portion of the dSCCS 200 to be mobile and thereby allow users to address dynamic communications demands and/or expand the communications radius of the mesh network 105.

Figure 5:
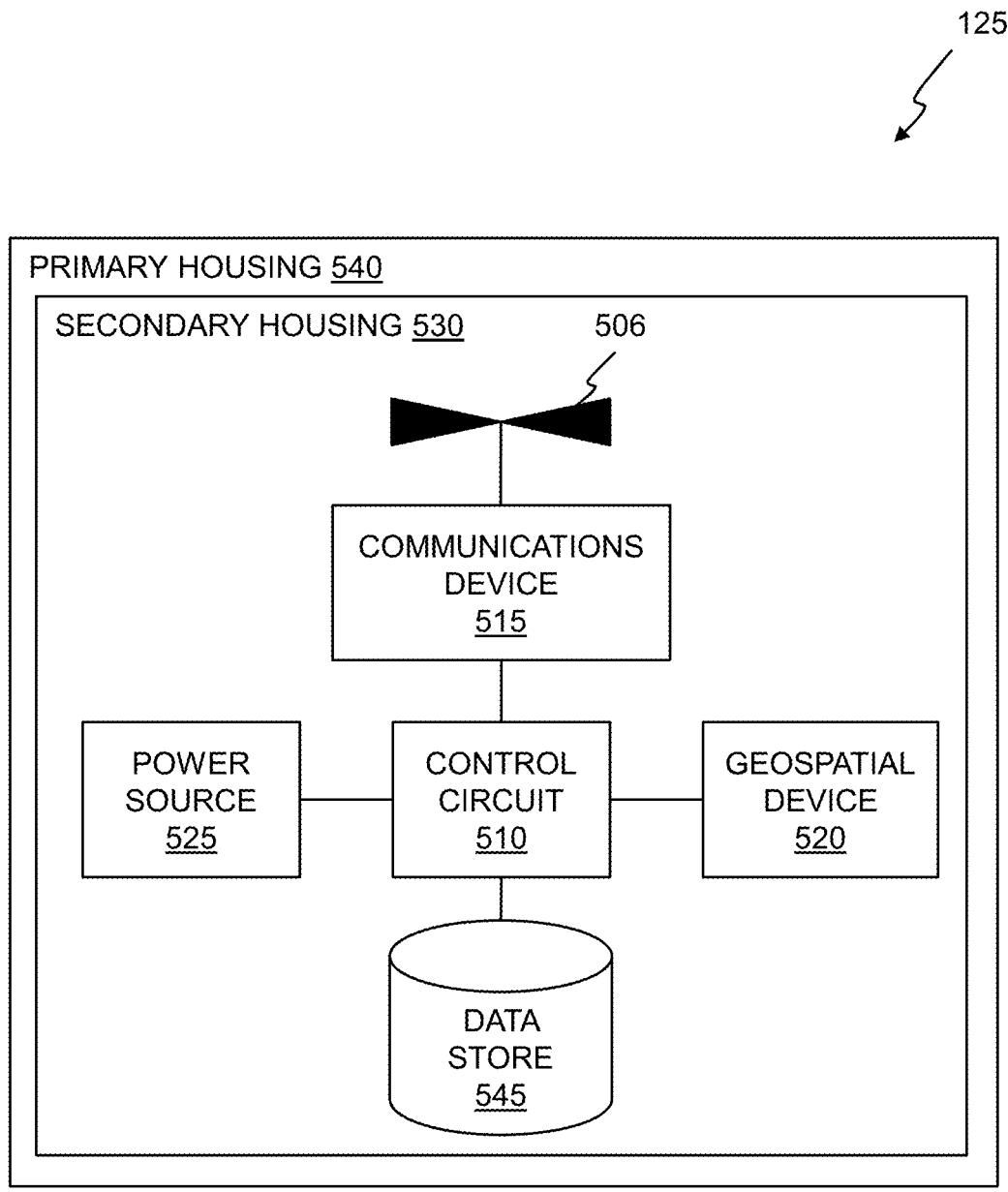
FIG. 5 depicts a block diagram of a secondary computing device ("SCD"), in accordance with certain embodiments.
Figure 6:
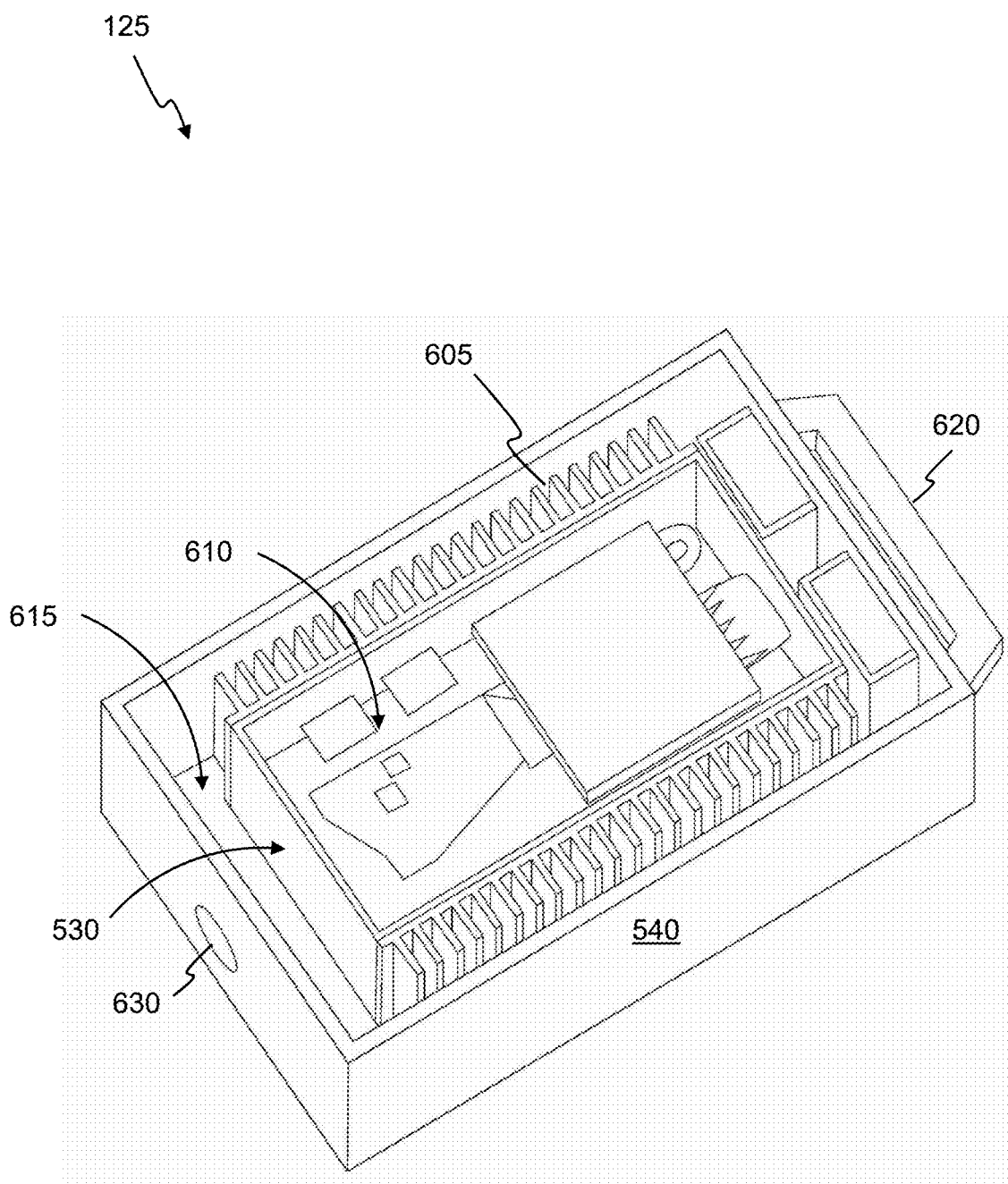
FIG. 6 illustrates a top perspective view of the SCD, in accordance with yet still other embodiments.
Figure 7:
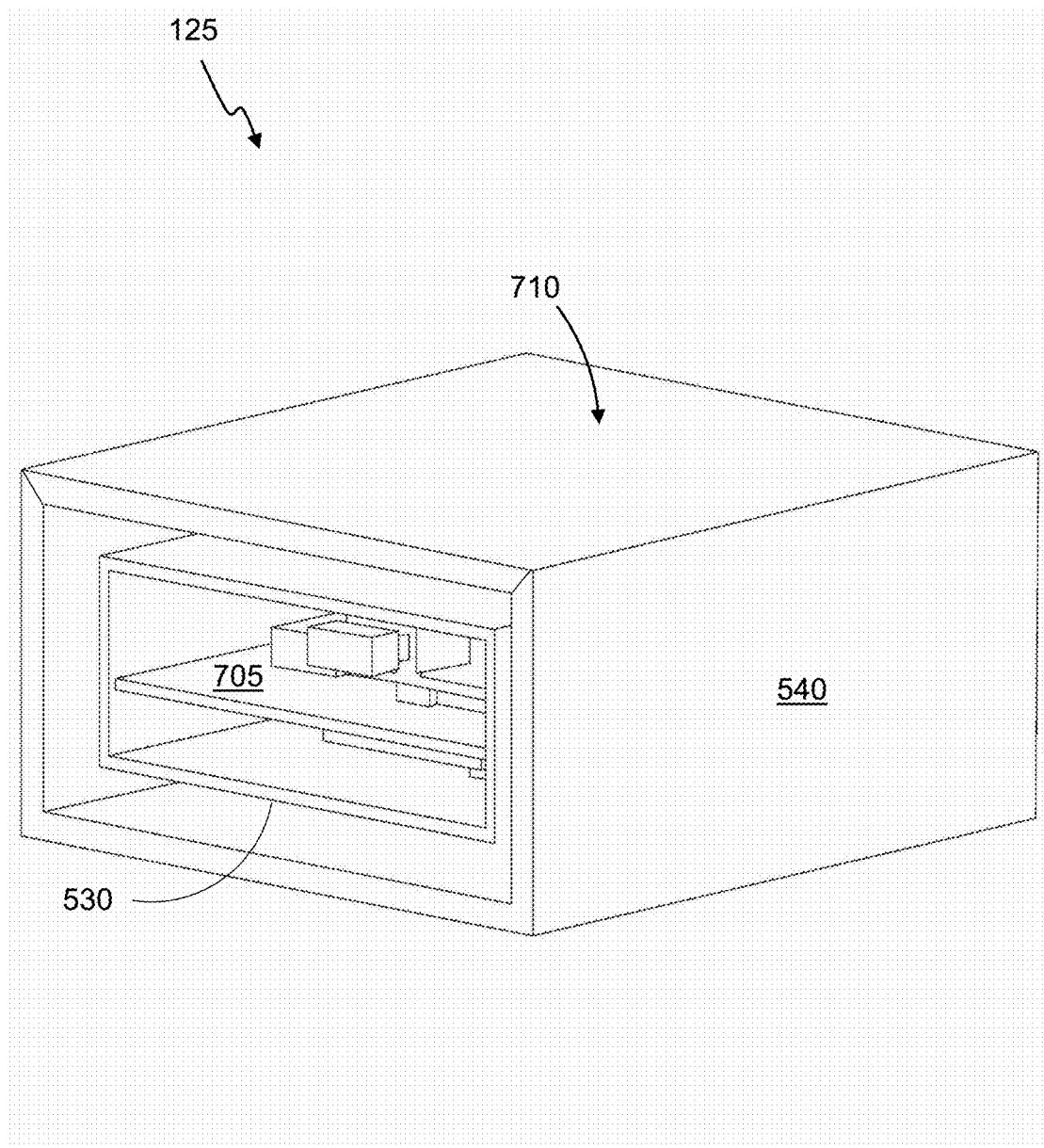
FIG. 7 illustrates a side perspective view of the SCD, in accordance with some embodiments.

FIG. 5 depicts a block diagram of the SCD 125, in accordance with certain embodiments. As shown, the SCD 125 can include a primary housing 540, a secondary housing 530, and a thermal dissipation structure 605 (e.g., a heatsink). Preferably, the primary housing 540 is an open-faced rectangular structure that includes a cover 710 that selectably couples to the open-face of the primary housing 540 to thereby seal the structure. The secondary housing 530 is a structure that is positioned within the internal space 615 of the primary housing 540. In general, the primary housing 540 is structured as a shell that is positioned around the secondary housing 530. The cover 710 preferably form a hermetic seal with the structure to keep moisture and gases out. Although depicted as rectangular, the primary housing 540 and/or the secondary housing 530 can have any geometric shape that addresses one or more embodiments of the instant disclosure.

To be sure, the SCD 125 is preferably man-portable and may include an attachment element 620 externally coupled thereto to demountably attach the SCD 125 to an apparel item and/or baggage item). Applicable attachment elements include, but are not limited to, built-in loop elements, hook elements, and similar attachment elements. The primary housing 540 includes the secondary housing 530 and the thermal dissipation structure 605 each positioned therein. The secondary housing 530 preferably includes a control circuit 510 communicatively coupled to the communications device 515, the geolocation device 520, and/or a power source 525 positioned in an internal space 610. Within the internal space 615, the thermal dissipation structure 605 preferably laterally extends from the secondary housing 530 towards the primary housing 540 and thereby is thermally coupled to the control circuit 510, the communications device 515, and/or the geolocation device 520.

In preferred embodiments, a thermal dissipation medium is applied or positioned between the primary housing 540 and the secondary housing 530 (i.e., within the internal space 615) to dissipate thermal energy generated by the thermal dissipation structure 605 (i.e., the thermal energy generated by the electrical components positioned within the secondary housing 530). Applicable thermal dissipation medium includes, but is not limited to, a wax, a mineral oil, and/or phase-change material. For example, compared to air, many mineral oils have a heat capacity roughly 1200 times greater. Applicable phase change materials ("PCM") include, but are not limited to, paraffin waxes, non-paraffin organics, hydrated salts, and metallics. There are several factors that need to be considered when selecting a PCM. An ideal PCM uses thermal energy storage ("TES") or latent heat thermal energy storage ("LHTES").

Paraffin waxes are the most common PCM for electronics thermal management because they have a high heat of fusion per unit weight, have a large melting point selection, provide dependable cycling, are non-corrosive and are chemically inert. For example, when designing with paraffin PCM, void management is important due to the volume change from solid to liquid. Paraffin PCM's also have a low thermal conductivity, so designing sufficient conduction paths is another key design consideration. The increase of the chain length of paraffin increases both the latent heat which is usually in the range from 128 KJ/kg to 198 KJ/kg and phase change temperature range from −12° C. to 71° C. The thermal conductivity of paraffin varies from 0.21 to 0.24 W/m K. These low values limit its widespread application.

Hydrated salts are another category. These PCM's have a high heat of fusion per unit weight and volume, have a relatively high thermal conductivity for non-metals, and show small volume changes between solid and liquid phases. These are not commonly used for electronics heat sinks, since they are corrosive and long-term reliability (thousands of cycles) is uncertain. Salt hydrates as part of the inorganic PCMs are more used in storage applications because of their high volumetric storage capacity of about 350 $MJ/m^3$, high thermal conductivity of about 0.5 W/m K and generally have a lower price in comparison with organic PCMs. Other PCM materials such as non-paraffin organics, and liquid-to-gas phase change materials are available, but are not often used for electronics heat sinks. Metallic PCMs are generally used at high temperatures, where no suitable paraffin wax is available.

The increased thermal properties, along with their dielectric nature, make mineral oils a viable solution for thermal dissipation. Preferably, a thermal dissipation medium is positioned between the primary housing 540 and the secondary housing 530 in a manner to be thermally coupled to and positioned adjacent to (i.e., at least partially surrounding) the thermal dissipation structure 605. In this manner, the thermal dissipation medium is thermally coupled to the control circuit 510 and/or the geolocation device 520.

The SCD 125 can further includes a power source 525 conductively coupled to the control circuit 510. The power source 525 can include one or more primary batteries and/or a secondary batteries. In some embodiments, the power source 525 is configured to be charged via conductive charging. Here, the power source 525 includes a metallic receiver coil conductively and physically coupled thereto. For example, a metallic charger coil is conductively and physically coupled to an energy source and generates a magnetic field (i.e., convert electricity to a magnetic field) that induces a current (i.e., a magnetic wave) in the receiver coil when the receiver coil and charger coil are in proximity with each other (e.g., near or in direct contact). Once received, the magnetic wave is converted back to electricity for storage in the secondary battery.

The control circuit 510 can share one or more functionalities and/or capabilities with the control circuit 410 (discussed above). The communications device 515 can share one or more functionalities and/or capabilities. The communications device 515 can include one or more antenna elements 506. The antenna element 506 can share one or more functionalities and/or capabilities with the antenna element 406. The data store 545 can share one or more functionalities and/or capabilities with the data store 440. The control circuit 510 can be configured to store geospatial information generated by the geolocation device 520 in the data store 545. The geolocation device 520 can share one or more functionalities and/or capabilities with the geolocation device 420. The control circuit 515 is configured to establish, via the communications device, the LAN 110 with the PCD 120.

Figure 8:
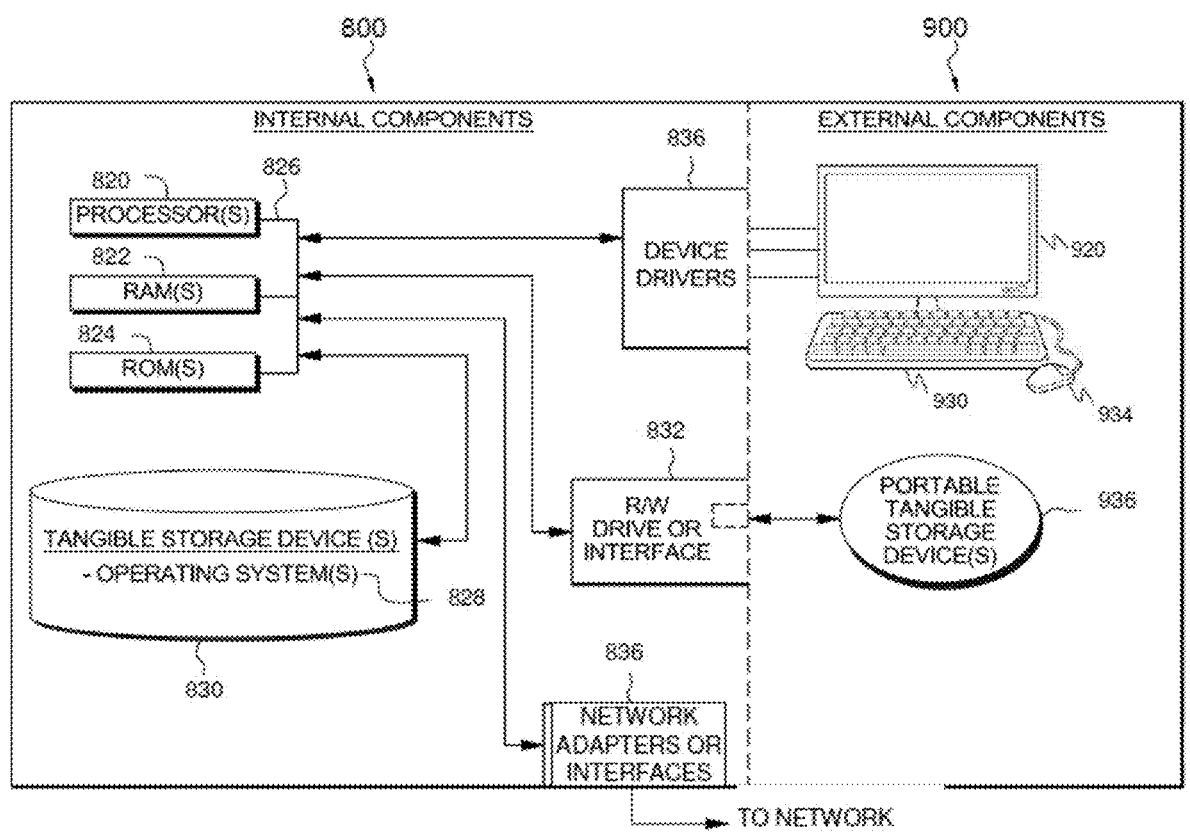
FIG. 8 depicts a block diagram of components of the PCD and SCD, in accordance with other embodiments.

FIG. 8 depicts a block diagram of components of the PCD 120 and/or the SCD 125, in accordance with an embodiment of the instant disclosure. Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, wearable computer, hand-held or laptop devices, multiprocessor systems, microprocessor-based systems, network PCs, minicomputer systems, and distributed cloud computing environments that include any of the above systems or devices.

The PCD 120 and/or the SCD 125 includes respective sets of internal components 800 and external components 900 as illustrated in FIG. 8. Each of the sets of internal components 800 includes one or more processors 820, one or more computer-readable RAMs 822 and one or more computer-readable ROMs 824 on one or more buses 826, and one or more operating systems 828 and one or more computer-readable tangible storage devices 830. One or more of program files, GUI protocols, and associated software are stored on one or more of the respective computer-readable tangible storage devices 830 for execution by one or more of processors 820 via one or more of the respective RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device, such as ROM 824, EPROM, flash memory or any other computer-readable tangible storage device that can store a computer program and digital information.

Internal components 800 also include a R/W drive or interface 832 to read from and write to one or more portable computer-readable tangible storage devices 936, such as a CD-ROM, DVD, memory stick, magnetic tape, magnetic disk, optical disk or semiconductor storage device. One or more of program files, GUI protocols, geospatial information, identification information, and associated software can be stored on one or more of the respective portable computer-readable tangible storage devices 936, read via the respective R/W drive or interface 832 and loaded into the respective computer-readable tangible storage devices 830.

Each set of internal components 800 also includes network adapters or interfaces 836 such as a TCP/IP adapter cards, wireless Wi-Fi interface cards, or 3G or 4G wireless interface cards or other wired or wireless communication links. One or more of program files, GUI protocols, and associated software can be downloaded to the PCD and/or the SCD, respectively, from an external computer via a network (for example, the Internet, a local area network or other, wide area network) and respective network adapters or interfaces 836. From the network adapters or interfaces 836, One or more of program files, GUI protocols, geospatial information, identification information, and associated software in the PCD 120 and/or the SCD 125 are loaded into the respective computer-readable tangible storage devices 830. The network may comprise copper wires, optical fibers, wireless transmission, routers, firewalls, switches, gateway computers and/or edge servers.

Each of the sets of external components 900 can include a computer display monitor 920, a keyboard 930, and a computer mouse 934. External components 900 can also include touch screens, virtual keyboards, touch pads, pointing devices, and other human interface devices. Internal components 800 also include device drivers 840 to interface to computer display monitor 920, keyboard 930 and computer mouse 934. The device drivers 840, R/W drive or interface 832 and network adapters or interfaces 836 comprise hardware and software (stored in storage device 830 and/or ROM 824).

Computer program code for carrying out operations of the present invention may be written in any combination of one or more programming languages, including an object oriented programming language such as Java, Smalltalk, C$^{++}$ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, though the Internet using an Internet Service Provider).

In certain embodiments, the instant disclosure seeks to provide a communications system that includes a plurality of PCDs and SCDs. Each PCD and SCD are man-portable Each PCD includes a communications device. Each SCD includes a geolocation device that generates geospatial data associated with the SCD as well as a unique identifier stored in a data store. The plurality of PCDs are configured to form a mesh network utilizing at least one IEEE 802.11x standard. Each PCD forms, via the communications device, a wireless LAN with at least one of the SCDs utilizing at least one second IEEE 802.11x standard. Each PCD receives, via the LAN, the geospatial data and the unique identifier from one or more of the SCDs. The PCD transmits, via the communications device, the geospatial data and/or the unique identifier to a command node included in the mesh network for conveyance via a display associated with the command node.

The display includes a GUI, which includes a map. The PCD is configured to map the geospatial data and the unique identifier to Earth coordinates in real-time or at predetermined intervals. At least one PCD includes an antenna element conductively coupled to the communications device. The antenna element includes a conductive composition, which includes a polymer and fully exfoliated graphene sheets. The fully exfoliated single sheets of graphene form a three-dimensional percolated network within the polymer. Each SCD includes a second communications device communicatively coupled to a second control circuit. The second communications device includes a second antenna element. The second antenna element includes the conductive composition. The second control circuit is configured to establish the wireless LAN.

Each SCD includes a primary housing, secondary housing, heatsink, and thermal dissipation structure. The primary housing includes the secondary housing positioned therein. The secondary housing includes geolocation device, second communication device, and thermal dissipation structure. The thermal dissipation structure laterally extends from the periphery of the secondary housing. The thermal dissipation structure is thermally coupled to one or more of the second communication device and the geolocation device. Each SCD includes a thermal dissipation medium positioned between the primary housing and the secondary housing. The thermal dissipation medium is thermally coupled to thermal dissipation structure. The thermal dissipation medium includes one or more of a mineral oil, a wax-based phase change material (PCM), a non-paraffin organic PCM, and a hydrated salt PCM.

Each SCD includes a power source is configured to receive electrical power by conductive wireless charging. At least one of the SCD and/or the PCB is man portable. The SCD includes an attachment element configured to demountably attach to an apparel item or a baggage item. The PCD is configured to be worn on the torso of a user. The geospatial data includes at least one of latitudinal data, longitudinal data, altitudinal data, and velocity data.

Based on the foregoing, a distributed self-contained communications systems has been provided in accordance with the instant disclosure. However, numerous modifications and substitutions can be made without deviating from the scope of the instant disclosure. Therefore, the instant disclosure has been disclosed by way of example and not limitation.

What is claimed is:

1. A communications system comprising:
   a plurality of primary computing devices ("PCD") each comprising:
      a communications device;
   a plurality of secondary computing device ("SCD") each comprising:
      a geolocation device that generates geospatial data associated with the SCD;
      a unique identifier stored in a data store;
   wherein
      each PCD and SCD is man-portable;
      the plurality of PCDs are configured to form a mesh network utilizing at least one IEEE 802.11x standard;
      each PCD is configured to
         form, via the communications device, a wireless local area network (LAN) with at least one of the SCDs utilizing at least one second IEEE 802.11x standard;
         receive, via the LAN, the geospatial data and the unique identifier from one or more of the SCDs;
         transmit, via the communications device, the geospatial data and/or the unique identifier to a command node included in the mesh network for conveyance via a display associated with the command node;
      the display comprises a GUI;
      the GUI comprises a map;
      at least one of the PCD and/or the command node is configured to map the geospatial data and the unique identifier to Earth coordinates in real-time or at predetermined intervals;
      at least one PCD comprises an antenna element conductively coupled to the communications device;
      the antenna element comprises a conductive composition;
      the conductive composition comprises:
         a polymer;
         fully exfoliated graphene sheets; and
         the fully exfoliated single sheets of graphene form a three-dimensional percolated network within the polymer.

2. The communications system of claim 1, wherein each SCD comprises a second communications device communicatively coupled to a second control circuit; the second communications device comprises a second antenna element;
   the second antenna element comprises the conductive composition; and
   the second control circuit is configured to establish the wireless LAN.

3. The communications system of claim 1, wherein each of the SCD comprises:
      a primary housing;
      a secondary housing;
      a heatsink;
      a thermal dissipation structure;
   wherein
      the primary housing comprises the secondary housing positioned therein;
      the secondary housing comprises
         the geolocation device;
         the second communication device;
         the thermal dissipation structure;
      the thermal dissipation structure
         laterally and peripherally extends from the secondary housing; and
         is thermally coupled to one or more of the second communication device and the geolocation device.

4. The communications system of claim 3, wherein each SCD comprises a thermal dissipation medium;
   wherein
      the thermal dissipation medium
         is thermally coupled to thermal dissipation structure;
         is positioned between the primary housing and the secondary housing; and
         comprises one or more of a mineral oil, a wax-based phase change material (PCM), a non-paraffin organic PCM, and a hydrated salt PCM.

5. The communications system of claim 4, wherein each SCD comprises a power source; and
   the power source is configured to receive electrical power by conductive wireless charging.

6. The communications system of claim 5, wherein at least one of the SCD and/or the PCB is man portable.

7. The communications system of claim 6, wherein the SCD comprises an attachment element configured to demountably attach to an apparel item or a baggage item.

8. The communications system of claim 6, wherein the PCD is configured to be worn on the torso of a user.

9. The communications system of claim 6, wherein the geospatial data comprises at least one of latitudinal data, longitudinal data, altitudinal data, and velocity data.

* * * * *